(12) United States Patent
Aharoni

(10) Patent No.: US 7,978,316 B2
(45) Date of Patent: Jul. 12, 2011

(54) MULTI-PHASE INTERFEROMETER

(75) Inventor: Avraham Aharoni, Rehovot (IL)

(73) Assignee: Technion Research & Development Foundation Ltd., Technion, Haifa (IL)

( * ) Notice: Subject to any disclaimer, the term of this patent is extended or adjusted under 35 U.S.C. 154(b) by 239 days.

(21) Appl. No.: 12/463,727

(22) Filed: May 11, 2009

(65) Prior Publication Data

US 2009/0213385 A1 Aug. 27, 2009

Related U.S. Application Data

(63) Continuation-in-part of application No. PCT/IL2007/001389, filed on Nov. 13, 2007.

(30) Foreign Application Priority Data

Nov. 13, 2006 (IL) .................................. 179204

(51) Int. Cl.
*G01B 9/02* (2006.01)

(52) U.S. Cl. ................. 356/28.5; 356/502; 356/498

(58) Field of Classification Search ................. 356/28.5, 356/486, 493, 498, 502
See application file for complete search history.

(56) References Cited

U.S. PATENT DOCUMENTS 4,019,818 A * 4/1977 Vilkomerson ................ 356/493

* cited by examiner

*Primary Examiner* — Hwa S. A Lee
(74) *Attorney, Agent, or Firm* — Kilpatrick Townsend & Stockton LLP

(57) ABSTRACT

An optical perturbation sensing system includes a probing beam incident on a medium with perturbations and a sensing beam redirected from the medium and incident on a surface area of a photodetector. A reference beam directed onto the photodetector surface forms, with the sensing beam, an interference pattern on the photodetector surface and a phase patterner with at least two phase regions across its section, generates different phases in different regions of the interference pattern. An array of photodetector elements detects each phase region of the interference pattern and a constructive combiner subtract pairs of the detected signals, squares the subtracted signal squares, and sums the squared signals to form a stronger detected signal with reduced intensity noise, reduced background noise, and reduced sensitivity to phase drifts.

20 Claims, 13 Drawing Sheets

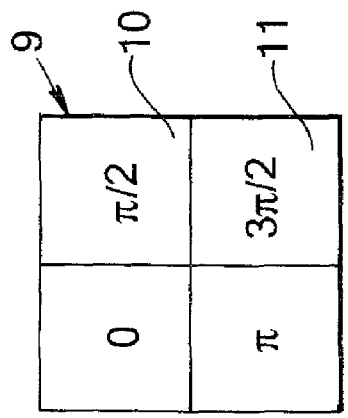
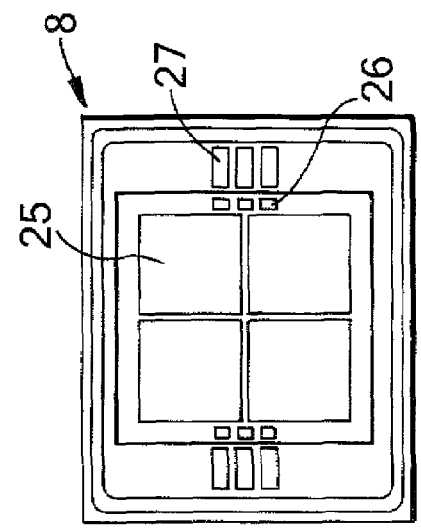
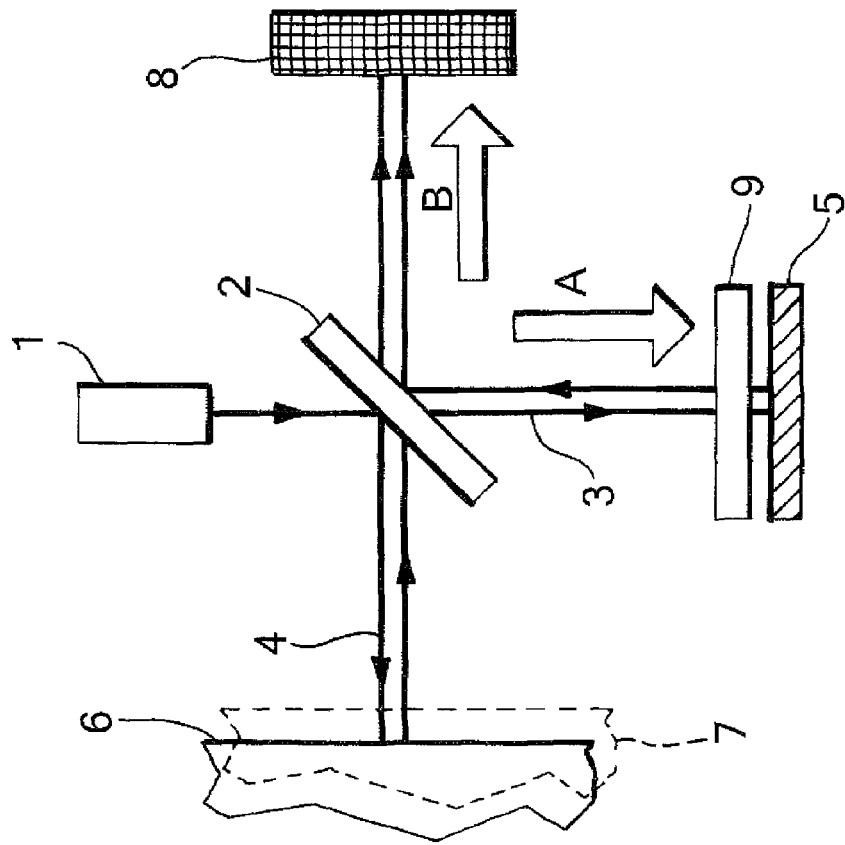

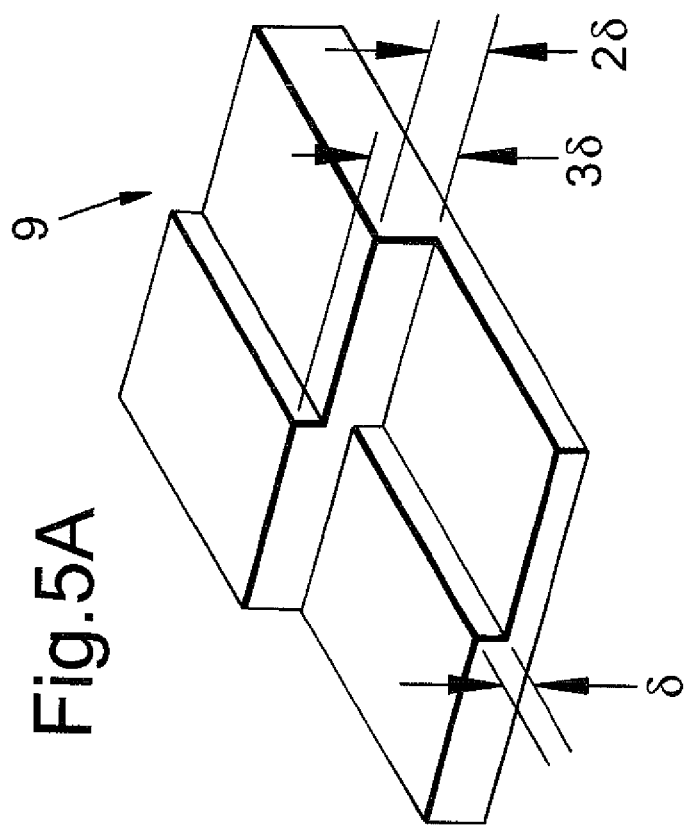
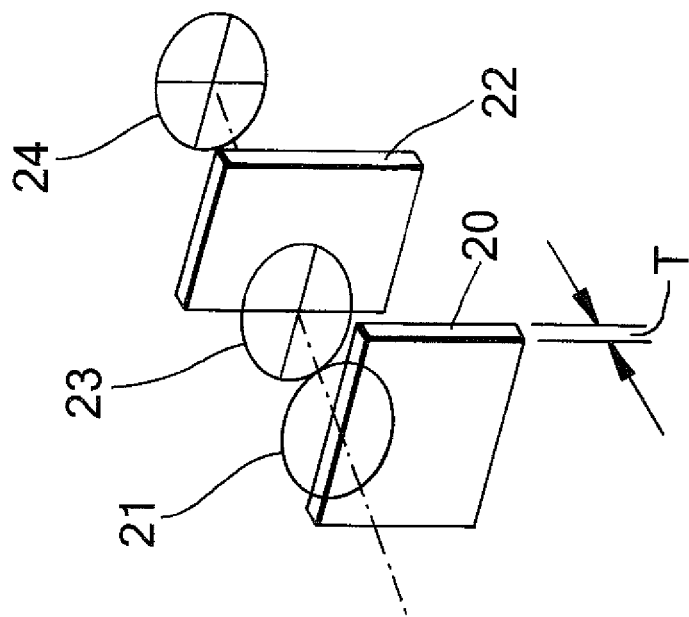

MULTI-PHASE INTERFEROMETER

RELATED APPLICATION

This application is a Continuation-In-Part application of PCT/IL07/001389 filed Nov. 13, 2007.

FIELD OF THE INVENTION

The present invention relates to a system and a method for interferometric optical sensing of small disturbances, and in particular, to interferometric optical sensing of a surface.

The invention can be implemented to advantage in a variety of optical sensing of vibrations, acoustic waves and ultrasound as well as other physical parameters which affect the phase of an optical probing beam. The present invention alleviates two major practical difficulties with implementation of interferometers in an uncontrolled environment: the drift in the sensitive "work-point" of the interferometer due to instabilities in the environment, and the presence of amplitude noise in the light source and the environment. Unlike state of the art methods for stabilizing interferometers, the present invention offers a low cost and compact implementation.

BACKGROUND OF THE INVENTION

Interferometric optical sensing is a subject of interest in a variety of fields for many different applications. In particular, optical vibration sensors are used to detect ultrasonic signals in different non-contact monitoring of vibrating surfaces, non-destructive testing of engineering products, for non-invasive monitoring of medical parameters, for a variety of scientific investigation of delicate or inaccessible materials and devices, and for other purposes. Optical detection offers many advantages, in particular, non-contact, wide-bandwidth and high sensitivity. Optical detection methods, and especially interferometers, however, suffer from high sensitivity to environmental effects, such as instability and vibrations in the test arrangement, and temperature variations. The environmental instabilities lead to drift of the interferometer from its optimal operation point, which lead to loss of signal intensity, and signal distortion. Such have been overcome with heterodyne and super-heterodyne demodulation methods. These solutions require optical frequency modulation and specialized optics, making them, as other state of the art solutions, relatively bulky and expensive.

Several methods to address the problem of interferometer instability at its "work-point" have been suggested previously. U.S. Pat. No. 4,109,818 (Vilkomerson) introduced two reference beams in phase quadrature in a single interferometric setup. The two beams are generated either by inserting a phase-shifting plate to cover a portion of the reference beam, or through phase-shifting one linear polarization in a 45° polarized beam. The former method is impractical due to alignment difficulties: the substantial difference in the optical paths of the reference beam portions; and the introduction of vibration noise through the difficulty to stabilize the relative location of the phase-shifting plate and the reference beam. The latter method is complex and also suffers from the need for high precision alignment as well as stability requirements.

U.S. Pat. No. 7,298,497 (Millerd et al.) stipulates an interferometric imaging system for sensing optical wavefronts split into four interferometric images detected with a single camera. To this end the image and the reference wavefronts are angularly separated by a diffractive component (holographic optical element) into multiple images, the reference of each shifted to a different phase multiple of 90°. Millerd et al. (as well as several workers referenced therein) mathematically combine the four phase-shifted interferograms to solve explicitly for the phase difference between the object and reference wavefronts.

The present invention proposes use of simple, low-cost readily manufacturable and compact components and offers both high sensitivity and good immunity from environmental effects.

DISCLOSURE OF THE INVENTION

In accordance with the present invention there is provided an optical perturbation sensing system, comprising a probing beam incident on a medium with perturbations, a sensing beam redirected from said medium and incident onto the surface of a photodetector, a reference beam directed onto the photodetector surface to form, with the sensing beam, an interference pattern on the photodetector surface, a phase patterner imposing at least two phase regions across its section, to generate different phases in different regions of said interference pattern, an array of photodetector elements, to detect each phase region of the interference pattern independently, and a constructive combiner for constructively combining detected signals from said elements, to form a stronger detected signal with reduced intensity noise, reduced background noise, and reduced sensitivity to phase drifts.

The invention further provides an optical perturbation sensing system, comprising a multiplexed probing beam set incident on a medium with perturbations, a multiplexed sensing beam set redirected from said medium and incident on a surface area of a photodetector, a multiplexed reference beam set directed onto a corresponding set of photodetector elements to form with said multiplexed sensing beam set an interference pattern on each the photodetector element surfaces, a set of phase shifters to shift the relative phase of each interference pattern on each of the photodetector elements, and a constructive combiner for constructively combining the detected signals from said photodetector elements, to form stronger detected signal with reduced intensity noise and reduced background noise and reduced sensitivity to phase drifts.

The invention still further provides a method for detection of perturbations in a medium, comprising generating a probing beam, incidenting said beam onto a medium, sensing the beam reflecting from said medium and incidenting it on a photodetector, combining said reflected beam with a reference beam on a photodetector, segmenting said photodetector into elements, introducing a phase patterner to pattern the phase of the interference pattern and generate a different interferometric phase on each said photodetector element, independently detecting signals from each element, subtracting pairs of said detected signals, squaring the subtracted signal squares, and summing up said squared signals to an overall stronger detection signal, with reduced intensity noise, reduced background noise and reduced sensitivity to spurious phase shifts.

The invention yet further provides a method for detection of perturbations in a medium, comprising generating a multiplexed probing beam set, incidenting said beam set onto a medium, sensing the beam set reflecting from said medium and incidenting each beam in the set on a photodetector, combining each said reflected beam with a reference beam from the multiplexed reference beam set on a photodetector, introducing phase shifters to shift the phase of each interference pattern and to generate a different interferometric phase on each photodetector, detecting signals from each photodetector element, subtracting pairs of said detected signals, squaring the subtracted signal squares, and summing up said squared signals to an overall stronger detection signal, with reduced intensity noise, reduced background noise and reduced sensitivity to spurious phase shifts.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is an illustration of a prior-art optical interferometer for sensing small phase perturbations;

FIG. 2 is a graphical representation of the prior art interferometric response to a small phase signal;

FIG. 3A is an illustration of an optical interferometer, incorporating a phase patterner and a photodetector array;

FIG. 3B is an illustration of a possible phase pattern to be implemented by the phase patterner;

FIG. 3C is a schematic illustration of a preferred embodiment of a photodetector array;

FIG. 4A is a graphical representation of the interferometric response to a small phase signal in two detection channels of the multi-phase interferometer according to the present invention;

FIG. 4B is a graphical representation, by dashed lines, of the interferometric response of the difference of two detection channels according to a possible embodiment of the multi-phase interferometer according to the present invention;

FIG. 5A is a schematic illustration of an embodiment of the phase patterner, based on mechanical stepped media, utilizable by the present invention;

FIG. 5B is a schematic illustration of a further embodiment of the phase patterner, based on thin transparent plates partially blocking the reference beam, utilizable by the present invention;

FIG. 6A is a schematic illustration of a further embodiment of the phase patterner, based on polarizers in a through-transmission configuration, utilizable by the present invention;

FIG. 6B is a schematic illustration of a further embodiment of the phase patterner, based on polarizers in a back-reflected configuration, utilizable by the present invention;

Figure 7:
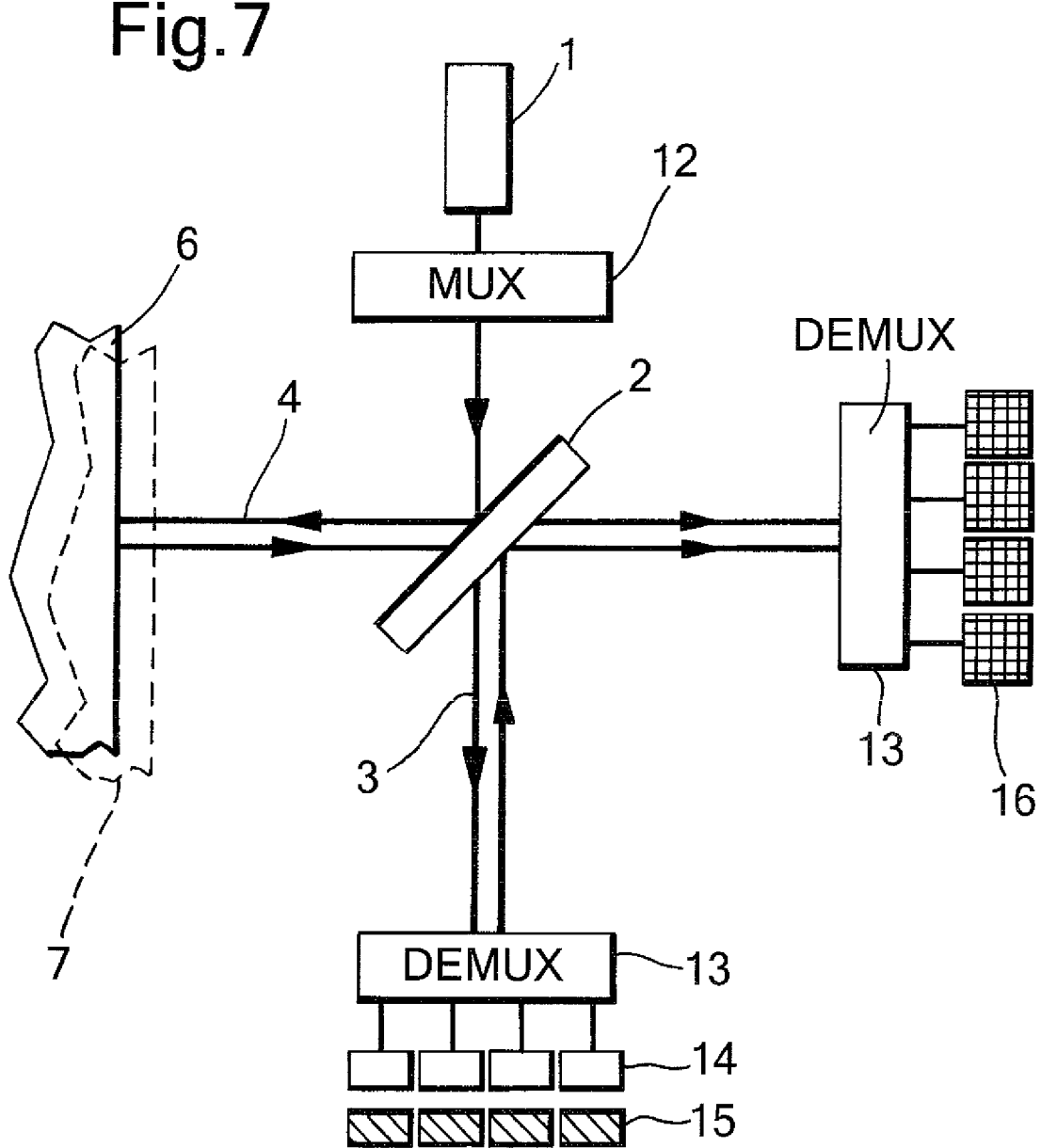
Figure 8:
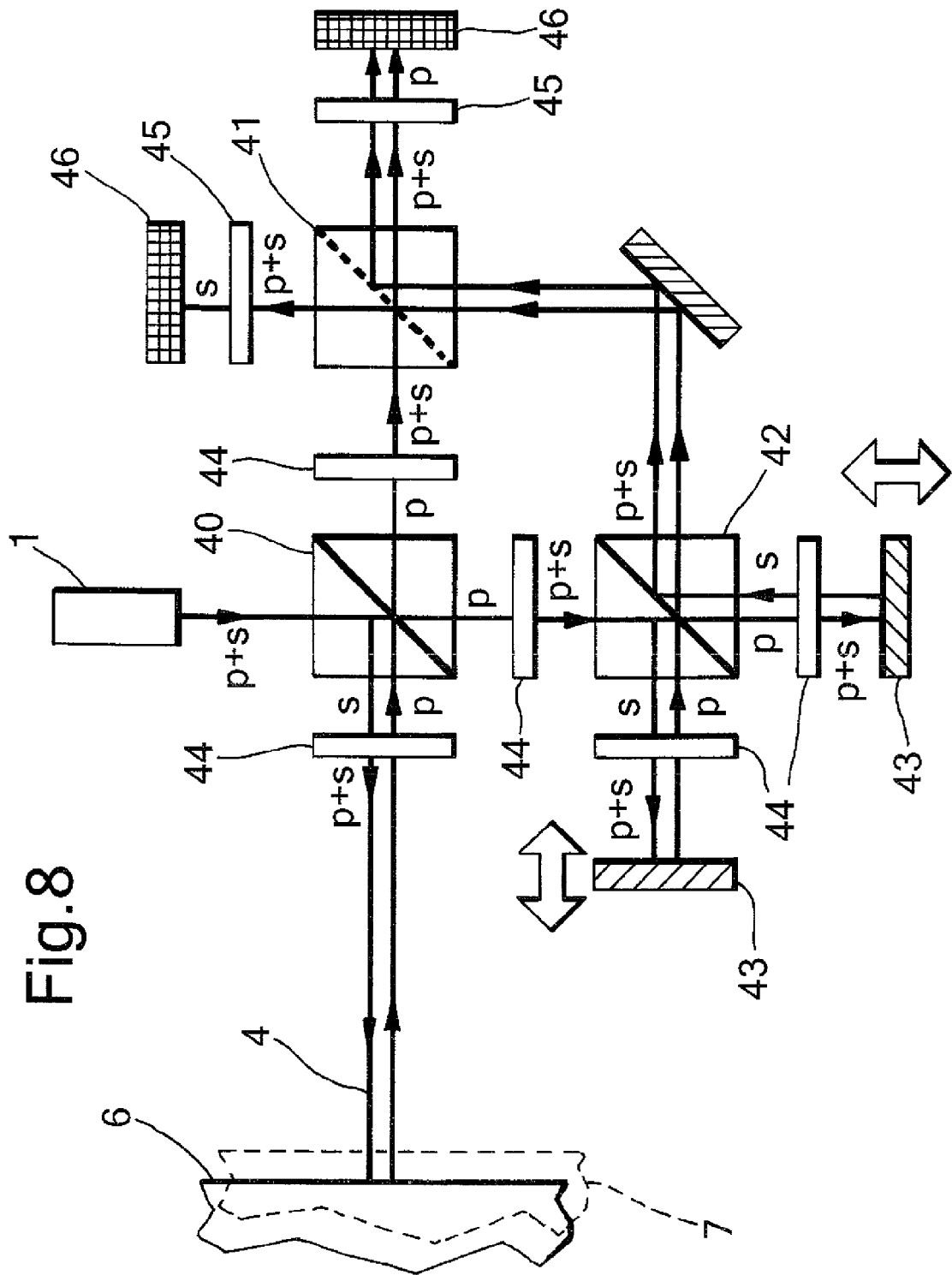
Figure 9:
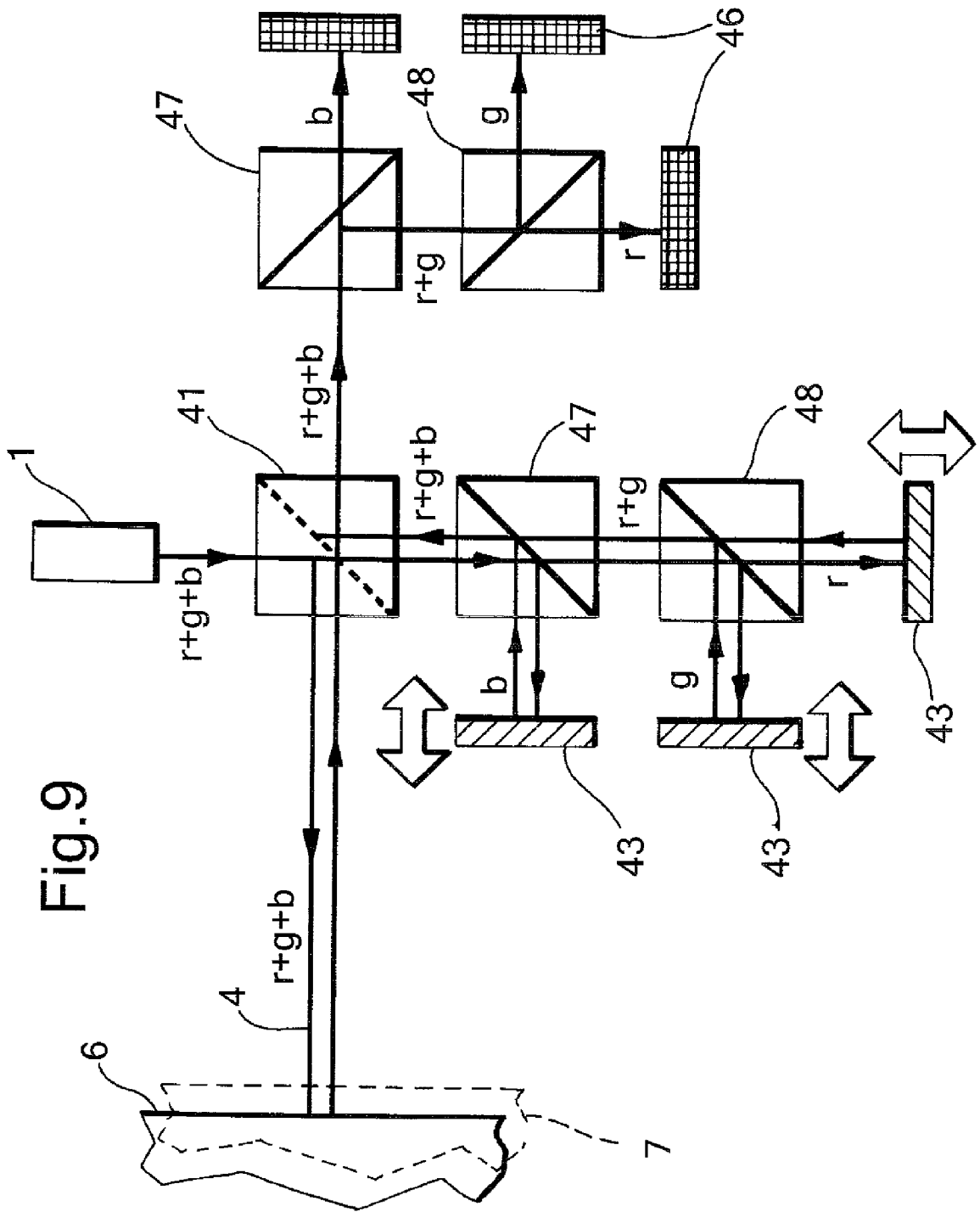
Figure 10:
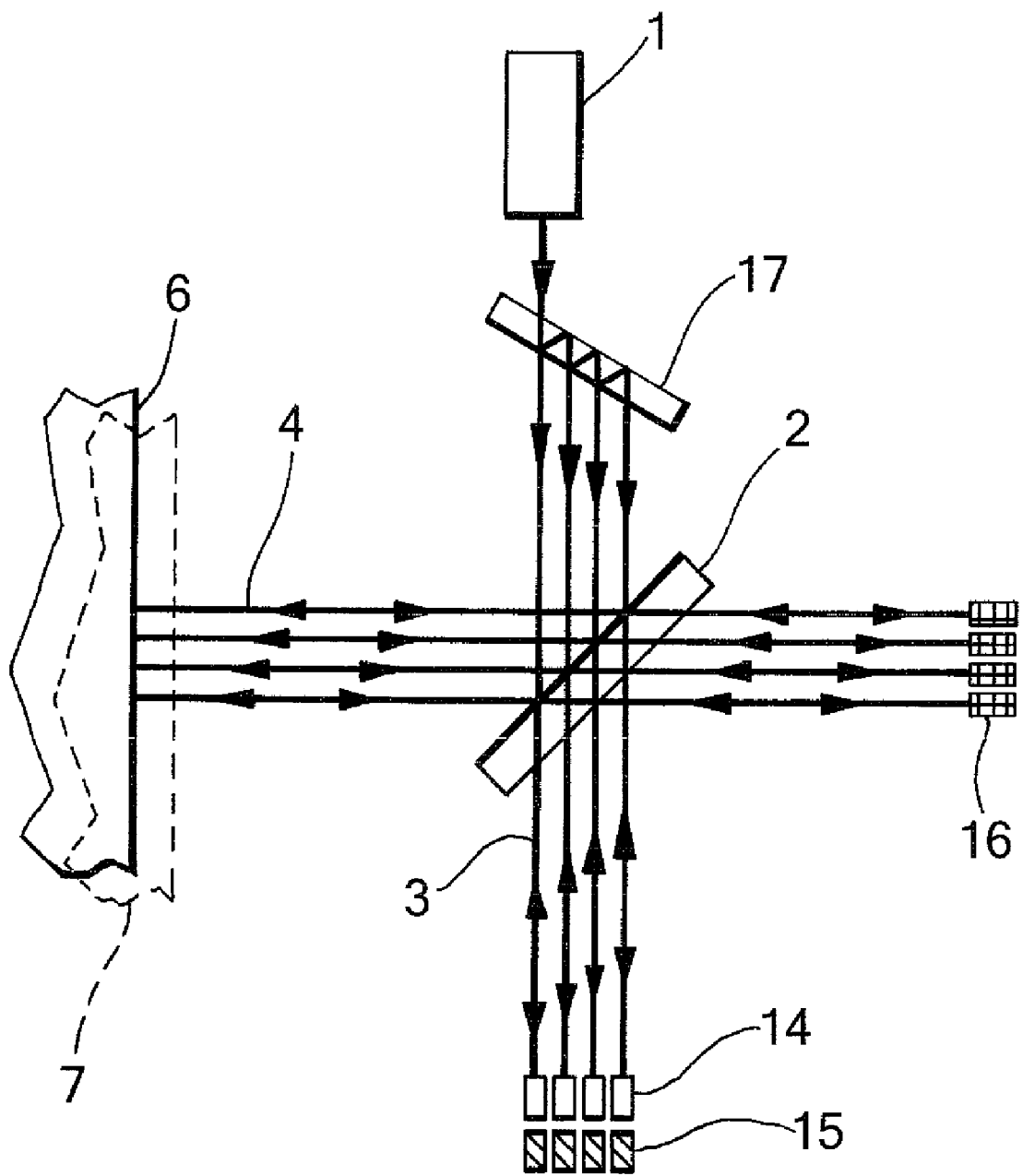
Figure 11B:
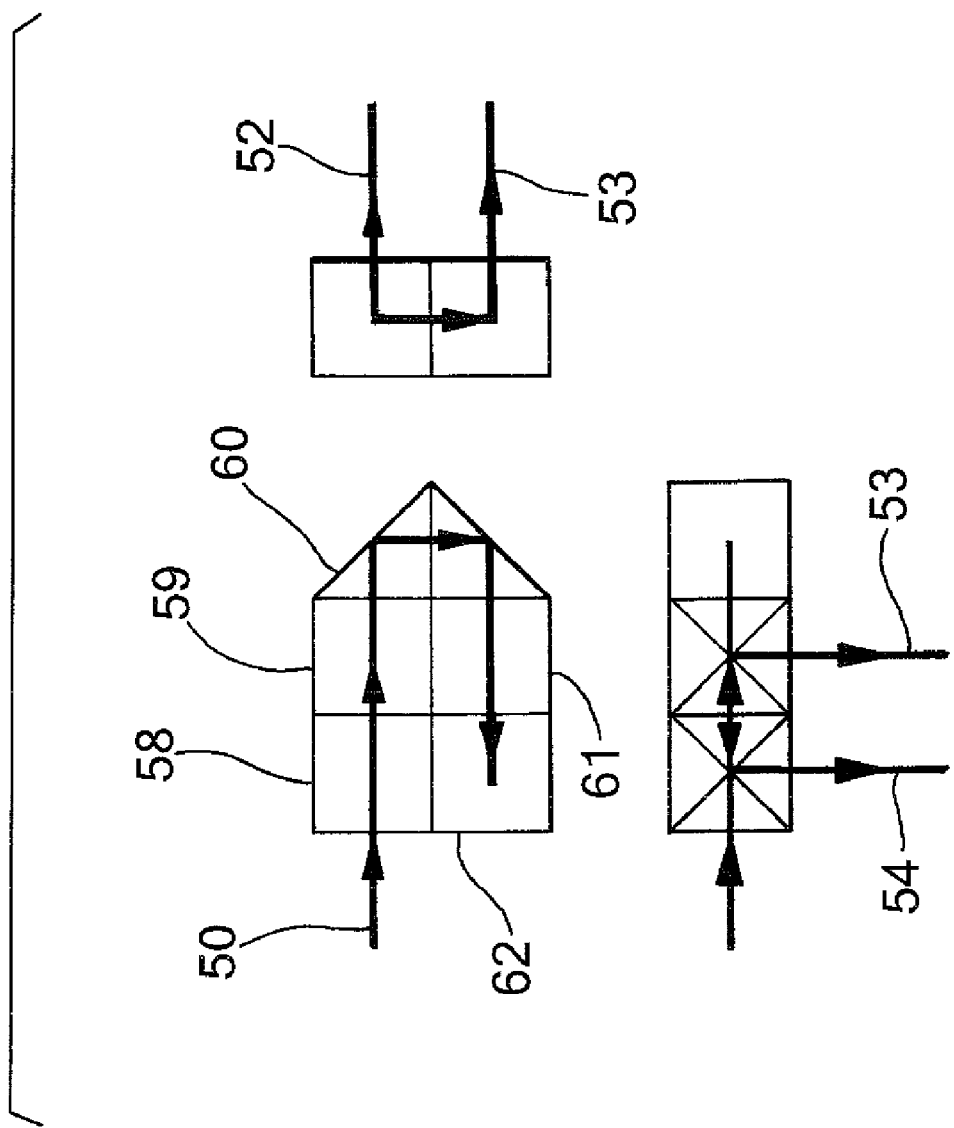
Figure 11A:
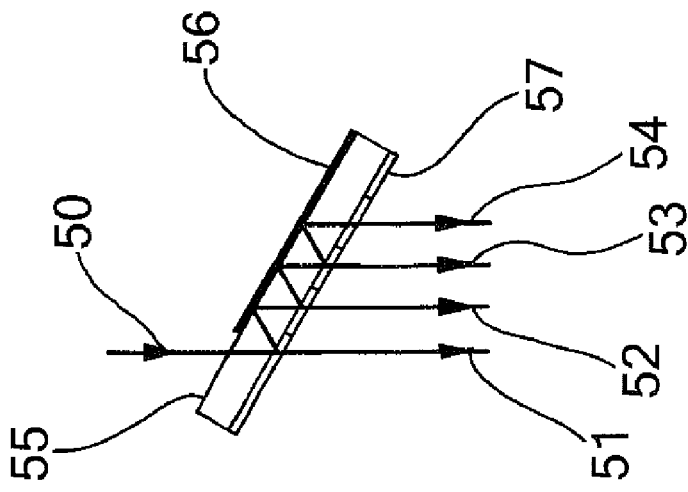
Figure 12:
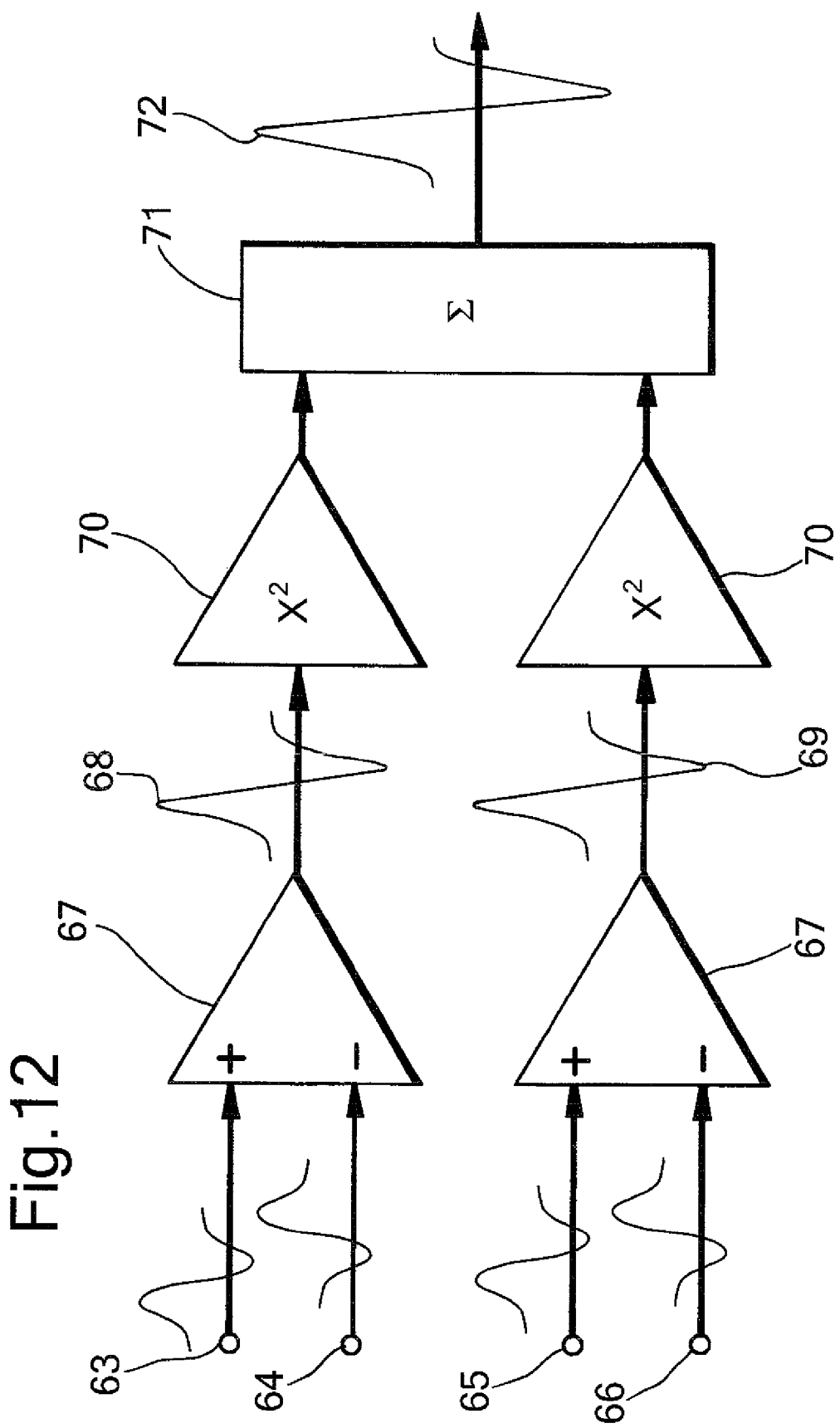

FIG. 7 is a schematic illustration of a multiplexed beam multi-phase interferometer;

FIG. 8 is a schematic illustration of a preferred embodiment of the multiplexed beam multi-phase interferometer incorporating an adjustable polarization phase patterner;

FIG. 9 is a schematic illustration of a further embodiment of the multiplexed beam multi-phase interferometer incorporating an adjustable chromatic phase patterner;

FIG. 10 is a schematic illustration of a further embodiment of the multiplexed beam multi-phase interferometer incorporating an spatial multiplexing;

FIG. 11A is a schematic illustration of a preferred embodiment of a four-way beam splitter for the spatially multiplexed beam multi-phase interferometer;

FIG. 11B is a schematic illustration of a further embodiment of a four-way beam splitter for the spatially multiplexed beam multi-phase interferometer; and FIG. 12 is an illustration of an embodiment of a signal processing technique utilizable by the present invention.

DETAILED DESCRIPTION OF EMBODIMENTS

Figure 1:
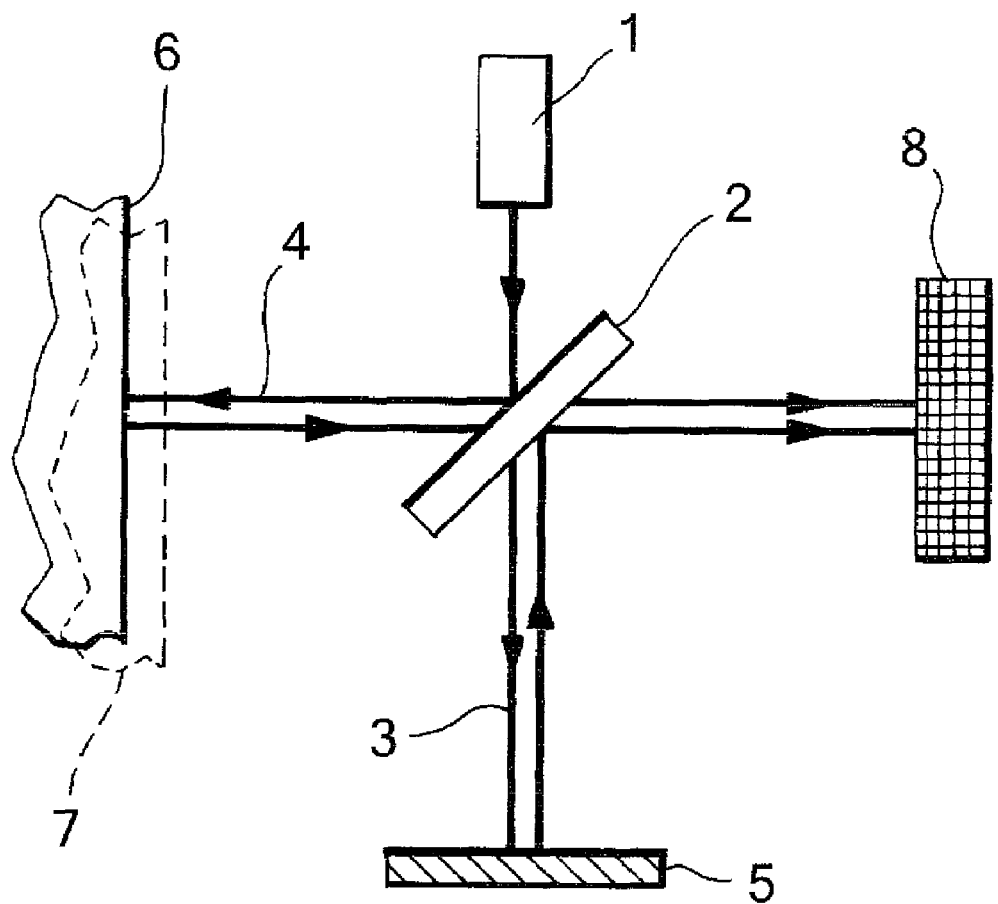

FIG. 1 schematically illustrates a Michelson optical interferometer. This configuration is well-known and sufficiently generic to represent other inter-ferometric configurations, such as the Mach-Zehnder, and the following description applies to other interferometric arrangements, which are not detailed here in the interest of brevity. In particular the following description addresses interferometric configurations where the reference beam is reflected back on itself (as in FIG. 1), and configurations where the reference beam is directed to travel only in one attitude over its path (as for example is the case in the Mach-Zehnder Interferometer). Also in the interest of brevity, the following description considers, by way of example, sensing surface perturbations; the description applies to any other interferometric detection of phase perturbations, both in a the surface reflected mode, as well as in a transmission through a medium.

Figure 2:
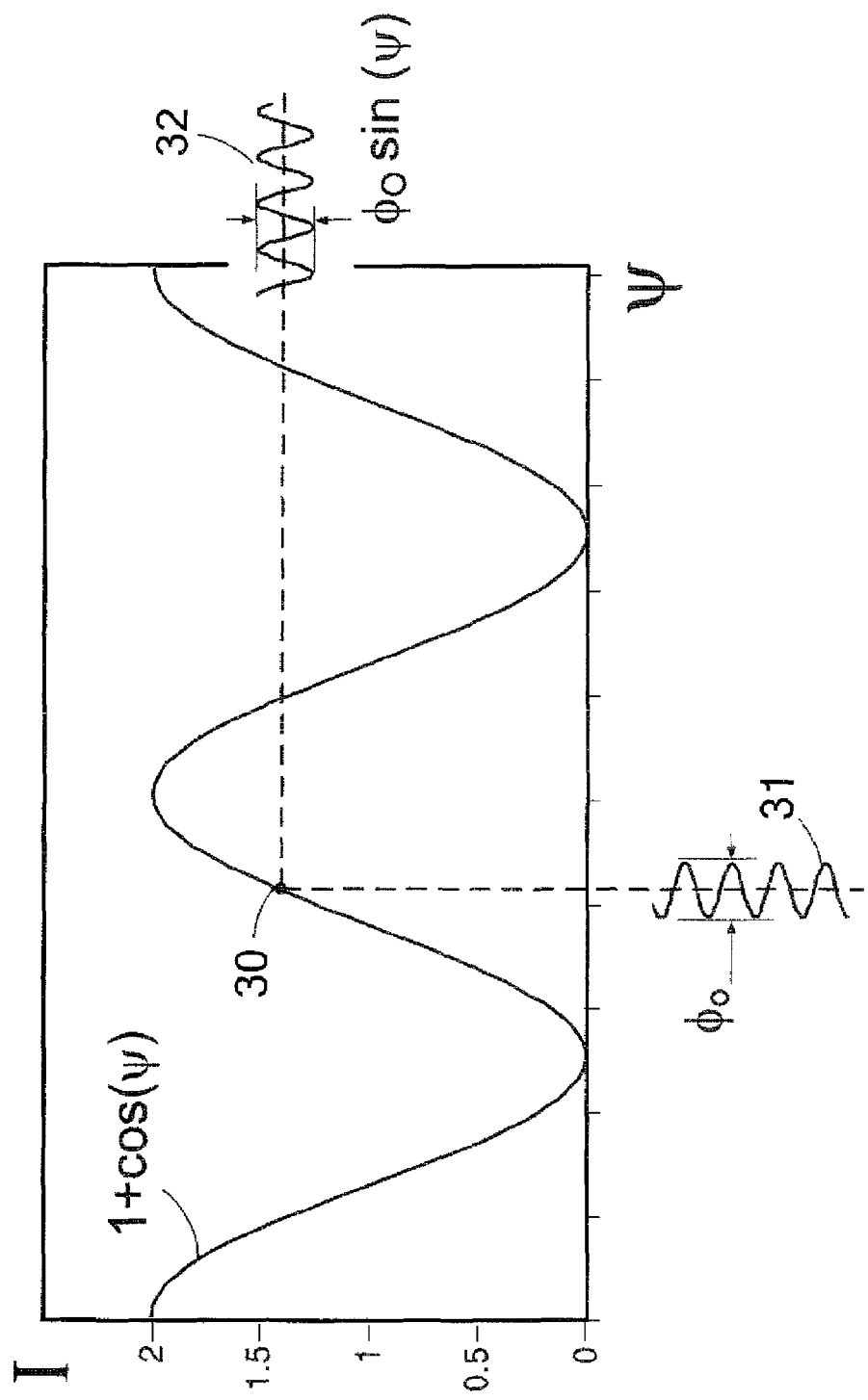

In a generic prior-art interferometer (FIG. 1), a light beam generated by a sufficiently coherent light source 1, such as a laser, is split by a beam splitter 2 into a reference beam 3 and a probing light beam 4. The reference beam is reflected by a reflector 5 back onto the beam splitter 2, a portion of which reaches the photo-detector 8. The probing beam is reflected off the surface of interest 6. Perturbation of surface 6 to a new location 7 shifts the redirected or reflected probing beam changing its relative phase. The resulting sensing beam is then redirected through the beam splitter and a portion of it reaches the photodetector 8. The sensing beam interacts with the reference beam on the photodetector to generate an electronic signal in the photodetector, which relates to the phase difference between the sensing and reference beams such that:

$$i \propto I_o\{1+\eta \cos [\phi(t)+\psi(t)+\Delta\phi]\}+I_n \quad (1)$$

where $I_o$ is the intensity of the light source, $I_n=I_n(t)$ represents spurious background light noise reaching the photodetector, $\eta$ is a measure of the visibility of the interference pattern, $\phi(t)$ the phase variations due to surface perturbations, $\psi=\psi(t)$ the phase variations due to spurious environmental effects and $\Delta\phi$ a constant phase difference between the reference and sensing beams. The graph of FIG. 2 shows the form of Eq. (1) for unity intensity and visibility ($I_o=1$, $I_n=0$, $\eta=1$). For optimal signal sensitivity, $\Delta\phi$ is selected to place the "work-point" 30 of the interferometer in the steepest slope of the Eq. (1). In general a small phase signal of $\phi_o$ generates an electronic signal proportional to $\phi_o \sin \psi$. even though $\Delta\phi$ is selected to place the interferometer in a good "work point", the drift of the spurious phase $\psi$ can shift the "work point" to locations where the signal is small or even vanishing, and lead to situations where the detected signal is inverted or otherwise distorted due to operating at a non-linear portion of the interferometric response curve. In this manner environmental effects result in loss of signal and signal distortions in a common interferometer.

FIG. 3A schematically illustrates an embodiment for overcoming the problem of random variation of the phase $\psi$ in an interferometer. The concept is based on introducing more than one interferometric channel, each channel with a different relative phase between the sensing and reference beams, $\Delta\psi$. Here the interferometric channels are implemented by introducing an array of detectors, designed to detect the signal in different regions of the combined signal and reference beam on the photodetector surface. As described in the following, it is possible to introduce different relative phases to different regions of the combined beam with a phase patterner 9 introduced into the interferometric arrangement, for example as indicated in FIG. 3A, in the path of the reference beam. FIG. 3B shows a preferred phase pattern of the phase patterner utilizable for implementing the present invention. This embodiment shows four phase regions, in relative phase steps of $\pi/2$; for example one region 10 is delayed by $\pi/2$ and another 11 by $3\pi/2$. FIG. 3C shows a possible configuration of the photodetector array utilizable for implementing four photodetector elements 25 for utilizing four interferometric channels for the present invention.

FIG. 3C illustrates the construction of a preferred embodiment of a photodetector array suitable for advantageously implementing in the present invention. The array of the photodetector 8 is preferably formed from a single semiconductor wafer. The individual elements 25 of the array may be formed by etching the semiconductor material. Alternatively, the array may be implemented as an assembly of individual detecting elements to form an array of detectors. Any number of detecting elements of different sizes and different shapes are possible. This embodiment shows a 2×2 array, each of approximately 1 mm² with a pitch of some 1.2 mm. Suitable electrical contacts 26 are etched on the same semiconductor wafer. The wafer is mounted onto a suitable substrate and the semiconductor contacts 26 are electronically connected to suitable contact pads 27 on the substrate. Typically, wire-bonding can be employed for the electronic contacts. Other bonding methods can also be used. The array can either be mounted in this format onto a hybrid circuit substrate, or packaged in a standard electronic enclosure, such as SMT, BGA, DIP or round metal casings. Alternative methods of assembly are also possible, including the mounting of individual photodetector elements to form a similar overall array.

Figure 4A:
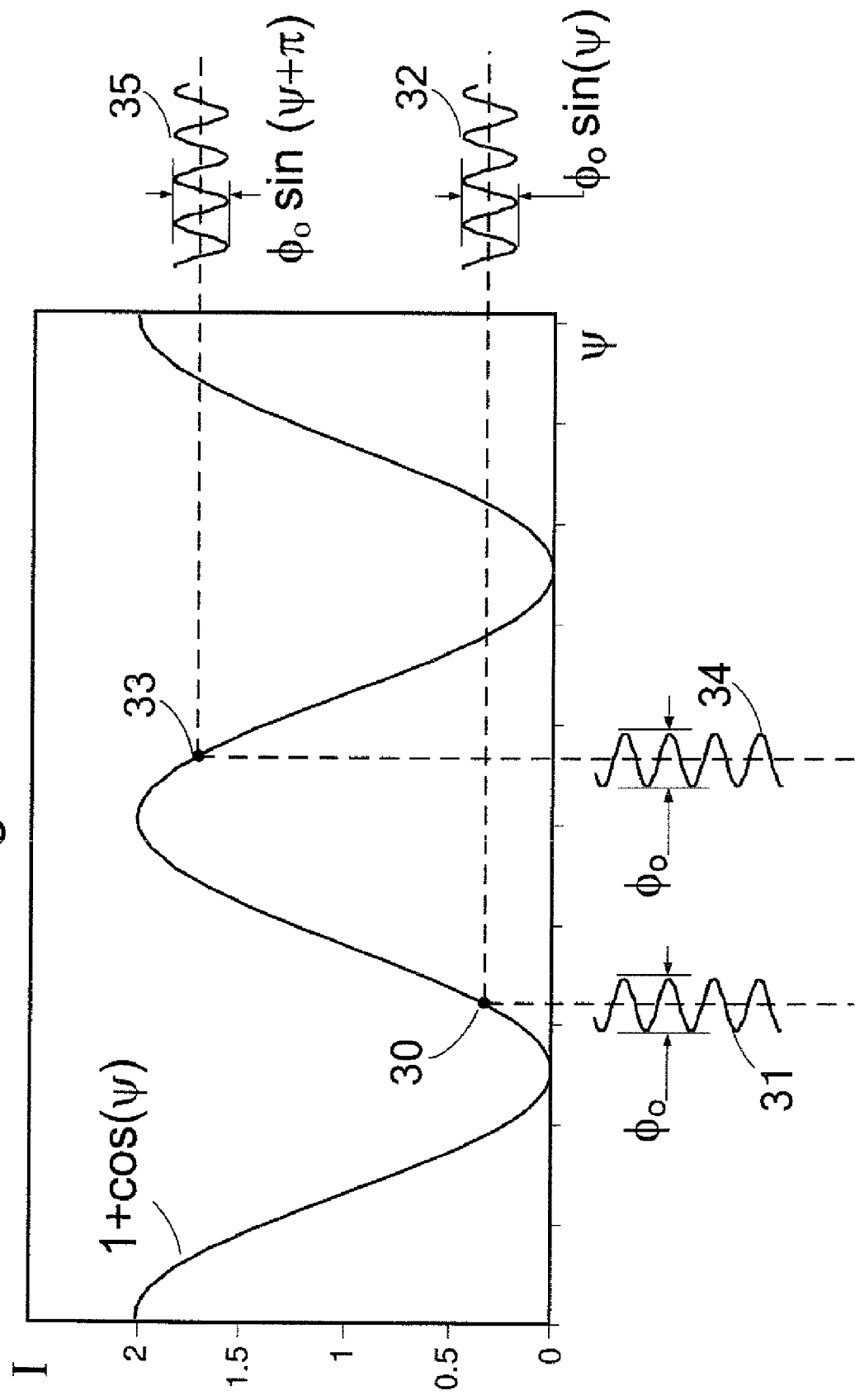

As an illustration of the proposed invention, there is shown in FIG. 4A two interferometric channels with the aid of an interferometric response curve. To the aforementioned interferometric channel, with "work-point" 30, surface perturbation 31 of amplitude $\phi_o$, and signal 32 of amplitude $\phi_o \sin(\psi)$, a second interferometric channel is added with "work-point" 33. The surface perturbation 34 are the same as for the previous channel, with the same amplitude $\phi_o$, and the resulting signal 35 is of amplitude $\phi_o \sin(\psi+\Delta\phi)$. Judicial choice of $\Delta\phi$ can ensure that the difference of the two signals can be used to alleviate the intensity noise $I_n$. As seen, for example, $\Delta\phi=\pi$, so that subtracting one signal from the other results in a larger overall signal. Furthermore, channels may be selected so as to ensure that for all $\psi$ at least one of the signals will be non-vanishing, thereby alleviating the difficulty with drift of $\psi$ due to environmental effects.

Using the format of Eq. 1 modified to account for the different channels i, $$i_i \propto I_o\{1+\eta \cos[\phi(t)+\psi(t)+\Delta\phi_i]\}+I_n, \quad (2)$$

a four-channel interferometric system can be formed with $$\Delta\phi_i = 0, \pi/4, \pi/2, 3\pi/4, \quad (3)$$

For which:

$$i_1 \propto (I_o + I_n)\{1 + \eta\cos[\phi(t) + \psi(t)]\} + I_n, \quad (4a)$$

$$i_2 \propto (I_o + I_n)\{1 + \eta\cos[\phi(t) + \psi(t) + \pi/4]\} + I_n, \quad (4b)$$

$$i_3 \propto I_o\{1 + \eta\cos[\phi(t) + \psi(t) + \pi/2]\} + I_n, \quad (4c)$$
$$= I_o\{1 - \eta\sin[\phi(t) + \psi(t)]\} + I_n,$$

$$i_4 \propto I_o\{1 + \eta\cos[\phi(t) + \psi(t) + 3\pi/4]\} + I_n, \quad (4d)$$
$$= I_o\{1 - \eta\sin[\phi(t) + \psi(t)\pi/4]\} + I_n,$$

Taking the difference signals,
$d_{13} = i_1 - i_3$, and $d_{24} = i_1 - i_3$, $$d_{13} \propto \eta I_o\{\cos[\phi(t) + \psi(t)] + \sin[\phi(t) + \psi(t)]\}, \quad (5a)$$

$$d_{24} \propto \eta I_o\{\cos[\phi(t) + \psi(t) + \pi/4] + \sin[\phi(t) + \psi(t) + \pi/4]\} \quad (5b)$$

The difference signals have achieved the two goals of the present invention: (a) they are both independent of any additive noise $I_n$; and (b) for any instantaneous value of $\psi$ at least one of these signals is non-zero. For a small phase perturbation, $\phi(t)\ll 1$, the above can be approximated by:

$$d_{13} \propto \eta I_o\{[1 + \phi(t)]\{\sin[\psi(t)] + \cos[\psi(t)]\}\}, \quad (6a)$$
$$= \sqrt{2}\eta I_o\{[1 + \phi(t)]\cos[\psi(t) - \pi/4]\},$$

$$d_{24} \propto \eta I_o\{[1 + \phi(t)]\{\sin[\psi(t) + \pi/4] + \cos[\psi(t) + \pi/4]\}\} = \quad (6b)$$
$$\sqrt{2}\eta I_o\{[1 + \phi(t)]\cos[\psi(t)]\}$$

On filtering the dc terms in Eqs. 6 the final form of the signals is $$d_{13} \propto \eta I_o\phi(t)\cos[\psi(t)-\pi/4], \quad (7a)$$

$$d_{24} \propto \eta I_o\phi(t)\cos[\psi(t)] \quad (7b)$$

Figure 4B:
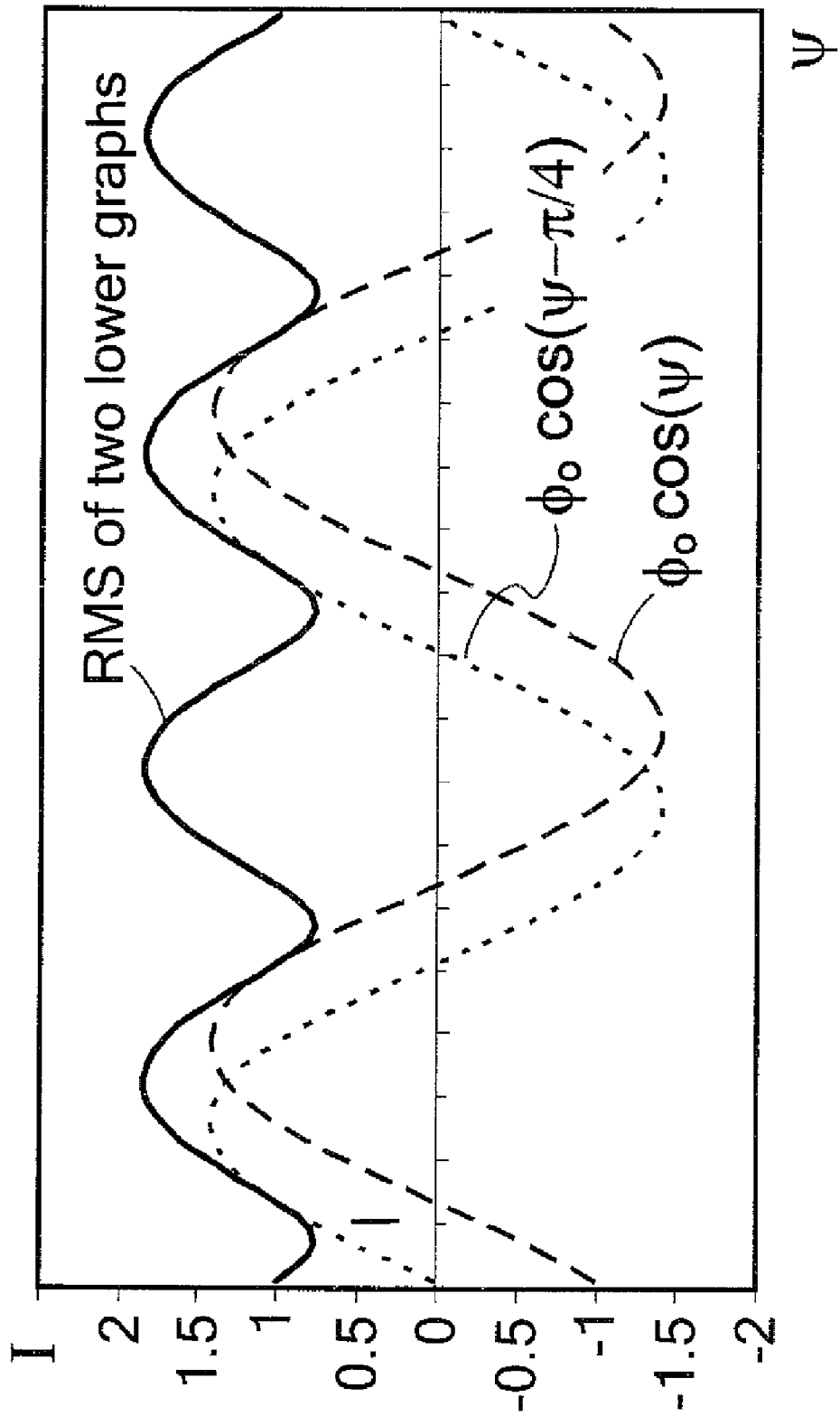

Eqs. 7 show that the differential detection signals are linearly proportional to the phase modulation $\phi(t)$. The additive noise, $I_n$, is completely eliminated from the detected signals, and for any value of the spurious phase drift $\psi(t)$ at least one of the signals does not vanish. FIG. 4B plots a normalized version of these two signals (with an arbitrary phase origin), showing graphically that the two signals do not vanish simultaneously, and that their rms summation, that is $(d_{13}^2+d_{24}^2)^{1/2}$, is always greater than 0.7.

Similarly, considering a four-channel interferometric system with the phase pattern of FIG. 3B $$\Delta\phi_i=0, \pi/2, \pi, 3\pi/2, \quad (8)$$

lead, in the case of small phase perturbations, to two differential signals of the form:

$$d_{13} \propto -\eta I_o\phi(t)\sin[\psi(t)], \quad (9a)$$

$$d_{24} \propto \eta I_o\phi(t)\cos[\psi(t)] \quad (9b)$$

The signals of Eqs. 9 are linearly proportional to the phase modulation $\phi(t)$; the additive noise $I_n$ is eliminated, and for any value of the spurious phase drift $\psi(t)$ at least one of the signals does not vanish. Eqs. 9 have an additional advantage in that they are in perfect quadrature so that now their rms addition is always unity, that is $$(d_{13}^2+d_{24}^2)^{1/2}=\eta I_o\phi(t) \quad (10)$$

Eq. 10 shows the important achievements of the present invention: an interferometric signal that is linear with the phase perturbation $\phi(t)$, is independent of any spurious phase disturbances $\psi$, and has filtered out all additive noise $I_n$.

The above two implementation examples show two four-interferometric channel implementations with different phase patterns. In addition to illustrating that there are many possible implementations for suitable phase patterns, this also indicates that there is broad tolerance in the actual accuracy of the phase shift of each channel, a very significant practical advantage. Of course, in addition to varying the values of the phase steps in the phase pattern, their form can be modified. Furthermore, additional interferometric channels can be implemented by increasing the number of phase steps in the phase patterner and accordingly the number of the detectors elements in the photodetector array.

Several implementations of the phase patterner are considered below. These patterners are intended to operate, for example, on the reference beam and be located in its direct path as the phase patterner 9 is located in FIG. 3A. In this case, the reference beam traverses the phase patterner twice—once on the way towards the reflector 5 and then again on the return of the reflected beam. In such a back-reflected mode of operation each phase step acts twice to generate a double phase step in the resulting patterned reference beam. Alternatively, in other interferometric configurations, such as the Mach-Zehnder interferometer, the reference beam may be made to traverse the phase patterner only once. This is the through-transmitted mode of operation where each phase step forges a single phase step in the resulting beam. Alternatively, the phase patterner may be introduced in other locations within the interferometric arrangement. For example a patterner can be located on the probing beam. Additionally and alternatively, more than one phase patterner may be use in different locations in the interferometric arrangement. For example, two-phase regions may be generated in the reference beam, and two additional phase regions by modulating the probing and/or sensing light beams. This is particularly relevant to a two-region phase patterner with a $\pi$ difference as such a pattern does is not distorted while propagating over large distances. Additionally and alternatively, a two region phase pattern may be forged on the source beam, and rotated 90° in the reference beam, say, so as to generate a four-region phase pattern on the photodetector 8. Additionally and alternatively, more than one implementation of a patterner may be used in the same interferometric setup; for example, a two-region polarization phase patterner of FIGS. 6A or 6B in combination with a two-region phase patterner of the form of FIG. 5A or 5B. A further alternative where the different phase channels are implemented by multiplexing interferometric beams, is described in the following.

FIG. 5A shows a four-region stepped phase-plate phase patterner. The regions are each spaced by $\delta$. Selecting $\delta = n\lambda/4$, for instance, where $\lambda$ is the wavelength of the light and n the refractive index of the substrate, introduces a phase shift of $\Delta\phi = \pi/2$ for a through-transmitted beam and $\Delta\phi = \pi$ for a back-reflected beam. Such a phase patterner may be manufactured by etching a transparent substrate to achieve the mechanical steps described. Alternatively, such steps can be affected by introducing dielectric coatings while masking portions of the substrate, where the refractive index of the coating material is used to calculate the induced phase step. Such a stepped phase patterner can be used in three different modes:

1. As a reflecting phase patterner: in this case the phase-patterner of FIG. 5A should be either made from a reflective material or coated with a reflective layer after its steps are manufactured. This patterner reflects the incident reference beam to generate a phase pattern of four regions with $\Delta\phi_i = 0$, $4\pi\delta/\lambda$, $8\pi\delta/\lambda$, $12\pi\delta/\lambda$. (In this case, there is no need for an additional reflector 5 in FIG. 3A).

2. As a through-transmission phase patterner. This patterner patterns the incident reference beam to generate a phase pattern of four regions with $\Delta\phi_i = 0$, $2\pi\delta n/\lambda$, $4n\pi\delta/\lambda$, $6\pi\delta/\lambda$.

3. As a back-reflecting phase patterner. This patterner patterns the incident reference beam to generate a phase pattern of four regions with $\Delta\phi_i = 0$, $4\pi\delta n/\lambda$, $8n\pi\delta/\lambda$, $12n\pi\delta/\lambda$.

FIG. 5B shows an alternative implementation for a four-region phase patterner comprising two thin transparent plates 20, 22 placed to partially intersect the optical beam at right angles (21, 23, respectively). For example, if one plate is implemented so as to shift by say, $\pi$, and the other by $\pi/2$, the four phase shifted regions 24, shown schematically in FIG. 5B as four quadrants with varying shading intensities, can meet the definition of Eq. 8. The thickness of these plates T is necessarily many wavelengths and an inaccurate multiple of wavelengths; nevertheless slight tilting of the plate can adjust the optical path length in the plate to a correct multiple of the desired phase shift. For example a phase shift of $\pi/2$ is obtained when the optical path through the substrate is an integer multiple N of $\lambda/4n$. Considering a plate of a thickness of T=0.1 mm, green light with $\lambda$=0.5 μm, and a glass substrate (n=1.5), the angle associated with a full shift of $\pi/2$, $\theta$ is found from $T(1/\cos\theta - 1) = \lambda/4n$, as $\theta = 2.3°$. This is quite a manageable value in practice, especially in view of the wide tolerance in the actual phase values as discussed above. Again, the two-plate phase patterner can be used either in a through-transmitted mode or in a back-reflected mode, the latter generating twice the phase shift in each step.

Figure 6A:
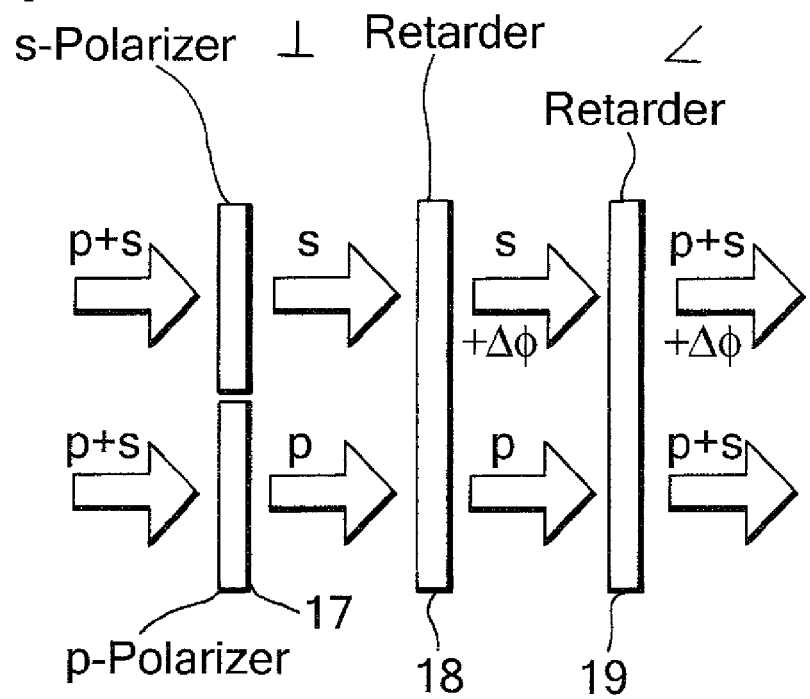
Figure 6B:
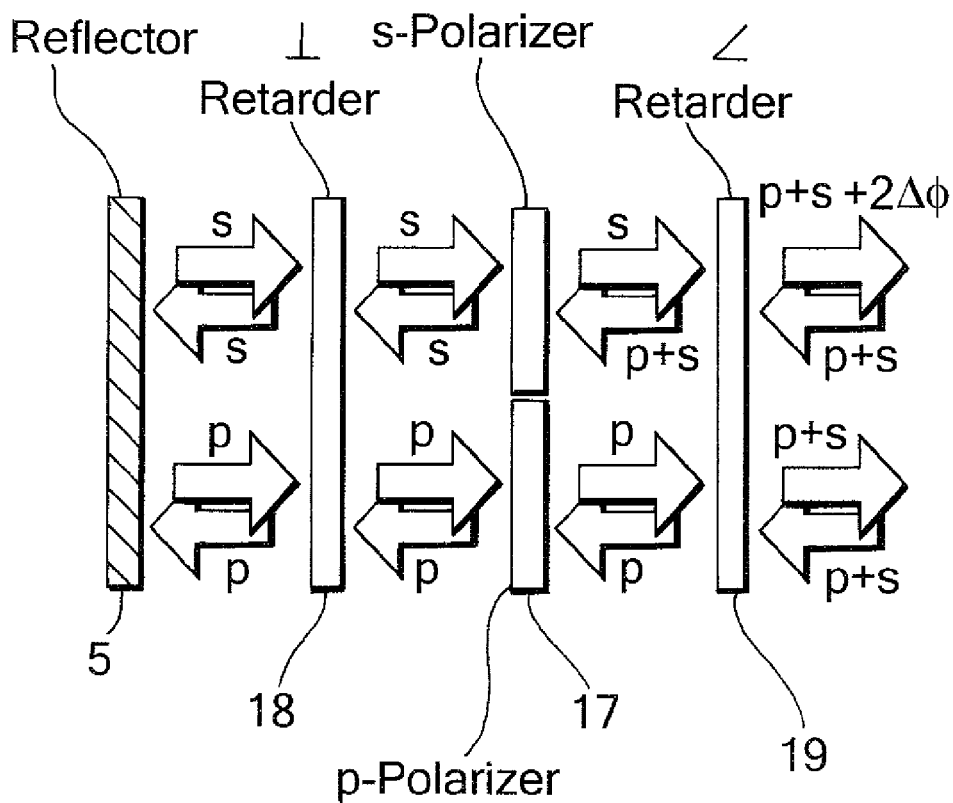

FIGS. 6A and 6B show a further alternative implementation for a suitable phase patterner based on polarization and optical retarders. A diagonally polarized light beam (indicated by the presence of both p- and s-polarizations in FIGS. 6A and 6B), is incident on p- and s-polarizers 17, each covering a portion of the beam. The two beam portions are then incident on a retarder plate 18 placed with its axes aligned to the polarizations; the extraordinary axes is "slower", introducing a phase shift $\Delta\phi$ in one of the polarizations, say the s-polarization, with respect to the other polarization. The resulting beam is now patterned in phase but with different polarizations in each region. Unless some other measures are taken to match the polarization of this beam with that of the sensing beam for interference on the photodetector, the polarization of the two regions should be rotated back to a diagonal state with a retarder 19 placed with the axes diagonal to the polarization axes and converted to linear polarization with a diagonal polarizer (not shown in FIG. 6A). This is the through-transmitted polarization-based phase patterner.

Similarly, a polarization-based back-reflection phase patterner can be implemented as shown in FIG. 6B. A diagonally polarized light beam (indicated by the presence of both p- and s-polarizations), passes through a retarder 19 placed with axes diagonal to the polarization axes (required for rotating the polarization of the back-reflected beam and of no significance at this stage). The beam is then incident on a p- and an s-polarizers 17, each covering a portion of the beam. The two beam portions are then incident on a retarder plate 18 placed with its axes aligned to the polarizations; the extraordinary axes is "slower" introducing a phase shift $\Delta\phi$ in one of the polarizations, say the s-polarization, with respect to the other polarization. The beam is then reflected by a reflector 5 and back-projected through the retarder 18, aligned to the polarization axes where the phase shift is doubled. The beam then passes through the polarizers 17, which bear no significance to the beam as they are already aligned with the polarization at each beam portion. The beam is now patterned in phase but with different polarizations in each of its portions. Unless some other measures are taken to match the polarization of this beam with that of the sensing beam for interference on the photodetector, the polarization of the two regions should be rotated back to a diagonal state with a retarder 19 placed with the axes diagonal to the polarization axes and converted to linear polarization with a diagonal polarizer (not shown in FIG. 6B).

The polarization phase patterners of FIGS. 6A and 6B generate a phase pattern with two phase regions. An additional polarization phase patterner, oriented at right angles to the first, can be used to introduce two additional regions. As previously, using a step of $\pi/2$ in one phase patterner and $\pi$ on the second, generates the four channel phase pattern of Eq. 8. Of course, as mentioned above, more than one type of phase patterner can be combined, and the different phase patterners can be located in different portions of the interferometric arrangement.

From a practical perspective, the correct operation of phase patterners are qualified with the aid of a vibrating mirror place in front of the interferometer (in place of the surface to be probed 6 in FIG. 3A). When the vibrating mirror is driven in a sinusoidal form, the signals at the different channels $i_i$, show the relevant relative phase shifts as predicted in Eq. 2. Furthermore, in cases where the phase patterner requires adjustments, as is in the case of the dual plates of FIG. 5B which need angular adjustment, these can readily be performed by monitoring the detected signals in each channel, $i_i$, when monitoring sinusoidal motion of the mirror.

FIG. 7 schematically illustrates an alternative implementation of multi-phase interferometer utilizing multiplexed interferometric beams. In this approach, several interferometric beams are multiplexed into a single interferometric arrangement, and rather than creating the interferometric phase channels by phase patterning an interferometric beam, different phase channels are implemented with the multiplexed beams. In addition to the components of a generic interferometer, the multiplexed beam embodiment introduces a multiplexer 12 to multiplex the different interferometric beams, and two demultiplexers 13: one to demultiplex the beams so as to enable their phase modifications in separate phase shifters 14, and the other to project the different interferometric patterns on to separate photodetectors 16. FIG. 7 shows four multiplexed beams, but any number of beams can be implemented. Alternatively and additionally, the multiplexed beam multi-phase interferometer may be combined with a phase-patterner so that some of the interferometric channels are implemented with a phase-patterner and others with a multiplexed beam.

Three implementations for the multiplexed-beam phase interferometer are described below. A two-beam polarization multiplexed multi-phase interferometer with two channels (FIG. 8), a three-beam chromatically multiplexed multi-phase interferometer with three channels (FIG. 9), and a four-beam spatially multiplexed multi-phase interferometer (FIG. 10). In all three cases there can be many permutations on the actual arrangements presented which serve as illustrative examples. In all three implementations the number of channels chosen is arbitrary and can be changed, either by adding multiplexed beams in the same multiplexed method or using another multiplexing method, or incorporating a phase-patterner to one or more of the multiplexed beams.

FIG. 8 schematically illustrates a two-channel polarization multiplexed beam multi-phase interferometer. A sufficiently coherent light source 1 projects a diagonally polarized beam (indicated by the presence of both p- and s-polarizations, denoted as s and p in the figure). A polarizing beam splitter (PBS) 40 redirects the s-polarization, say, as a probing beam 4 through a polarization rotator 44 towards the surface of interest 6. The sensing beam returning from the surface is phase modulated by the movement of the surface 7 and, passing again through the phase rotator 44 it is converted to p-polarization and traverses the PBS 40. At that point, the polarization of the sensing beam is rotated again and is incident on a beam splitter 41 where a portion of it reaches each of the two photodetectors 46 after passing through the s- and the p-polarizers 45 located in front of the detectors, where it interferes with the s- and the p-polarization reference beams respectively. The reference beams are formed from the p-polarization traversing the first PBS 40, by rotating it in a rotator 44 and splitting the beam into s- and p-polarization in the second PBS 42. Each of the s- and the p-polarized beams is now rotated and back-reflected through the second PBS to form a coincident s- and p-polarized reference beam. This reference beam is split by beam-splitter 41 and a portion of it reaches each of the photodetectors 46 where they are filtered to only s- and p-polarized with the polarizers 45 and can interfere with the portions of the sensing beam reaching the same photodetectors. In this manner, separate s- and p-polarization channels are formed. The reference phase $\Delta\phi$ of each channel is controlled independently by, say moving the redirecting mirrors 43, so that an appropriate phase can be implemented to each of the channels as required.

FIG. 9 schematically illustrates a three-channel polarization multiplexed beam multi-phase interferometer. A sufficiently coherent polychromatic light source 1 projects a polychromatic beam. For the purpose of this description the source is considered to comprise three wavelengths, red, green and blue (indicated by r, g, b in FIG. 9), although a similar implementation is extendable to a larger (or smaller) number of wavelengths and resulting channels. A beam splitter 41 splits the beam into a probing and reference beams. The probing beam is reflected off the surface of interest and is redirected towards a set of two dichroic filters, 47 and 48, where the polychromatic beam is separated to three color channels, r, g, b. Each of the colors is incident on a separate detector where it interferes with a reference beam of the same color. The reference beams, after leaving the beam splitter 41, are directed to two dichroic filters, 47 and 48, where the polychromatic beam is separated into three color channels, r, g, b. Each color channel phase shifted, by controlling the location of its reflector 43, for example, and redirected back through the dichroic filters to the beam splitter 41. The reference beams then retrace the path of the sensing beam, each reaching its channel to interfere with the sensing beam at the same channel. The reference phase $\Delta\phi$ of each color channel is controlled independently by, say moving the redirecting reflectors 43, so that an appropriate phase can be implemented to each of the channels as required.

FIG. 10 schematically illustrates a four-channel spatially multiplexed beam multiple-phase interferometer. A sufficiently coherent polychromatic light source 1 projects a thin beam. A four-way beam splitter 17 builds up four independent, but closely spaced beams. FIG. 10 shows this is implemented with a transparent plate using multiple reflections off its inner faces. The separation of the output beams is controlled by the thickness of the plate and the angle the plate subtends with the incident light; the thicker the plate and the larger the tilt angle (up to 45°) the greater the separation of the output beams, and these are adjustable for an optimal multi-beam pattern. The basic performance of an untreated four-way beam splitter is improved substantially by introducing a graded reflective layer on the output surface of the beam splitter, and a high reflective layer on the back surface (except where the source beam is input). The result is essentially a set of four independent interferometers, all probing the moving surface 6, and each utilizing a separate reference phase shifter 14 and reflector 15, and a separate detector 16, all compacted together.

In considering the beam-separating four-way splitter, it can be implemented with a glass plate, for which the surface reflections are approx. 4%. In such a beam splitter, the first beam would be reduced by two reflections from two surfaces, or 92% of the incident beam. The second beam sets off with 4% reflected off the front surface and then after reflection of 4% off the back surface and loss of 4% on the front surface, emerges as $1.5 \times 10^{-3}$. The following beams are left with $2.4 \times 10^{-6}$, and $3.8 \times 10^{-9}$, of the incident beam, respectively. To improve on this performance it is possible to coat the surfaces of the splitter (except the region of the input beam). A simple solution entails coating with a high reflectivity on the back face. In this case there is a tradeoff between the differences in the beam intensities and the overall intensity transmitted through the beam splitter. Table 1 below shows the results for a back reflectivity of 90% and a uniform front reflectivity of 85%. The total intensity through the splitter is 40% and the variation between the strongest and weakest beam is reduced to approximately a factor of 2. A further improvement, illustrated schematically in FIG. 11A, is implemented with graded coating on the front surface, in a manner which affects only one beam at a time. FIG. 11A shows the input beam 50, which is incident and enters a transparent substrate with parallel sides in an uncoated region. The four split beams 51 through 54 exit on the opposite face of the substrate following zero to three internal reflections off the back face of the substrate, respectively. This back face is coated 56 for high reflectance. The exit face of the substrate is coated with a coating having a graded reflection 57 where a gradually lower reflection is affected at each split beam 51 to 54. Theoretically, if the back reflection could be made 100% these graded reflectivities would need to be 75%, 66.6%, 50% and 0% to generate approx 24% of the incident beam intensity in each beam. In practice, however, the reflectivity of the back surface does not reach 100%, and there is always some reflectivity in front of the 4$^{th}$ beam. Taking the former as 90% and the latter as 4% again, the optimal reflectivities at each beam output are found as detailed in Table 2. The total intensity through the beam splitter here is a little over 80%.

TABLE 1 uniform front reflectance, max back reflectance

| Beam | 1 | 2 | 3 | 4 | Back |
|---|---|---|---|---|---|
| Reflectance | 85% | 85% | 85% | 85% | 90% |
| % output | 14% | 11% | 8.4% | 6.4% | |

TABLE 2 graded optimized front reflectance, max back reflectance

| Beam | 1 | 2 | 3 | 4 | Back |
|---|---|---|---|---|---|
| Reflectance | 79% | 70.5% | 53.5% | 4% | 90% |
| % output | 20.2% | 20.1% | 20.1% | 20.0% | |

In general it is possible to form the multiple beams in the interferometer in different manners; for example a separation in two dimensions offers a more compact configuration. This can be achieved by means of two tilted plates at right angles to each other. FIG. 11B schematically illustrates three perspectives of an alternative preferred embodiment for a two dimensional four-way beam splitter. The input beam 50 (seen in the plan and elevation views) enters a first beam splitter 58, where the first output beam is split off (hidden from view in FIG. 11B). The beam continues to the second beam splitter 59, where the second output beam is split off (52 in the side view) and is redirected by folding reflectors 60 to the third beam splitter 61 and eventually to a downward reflector 62 where the third and fourth output beams (53 and 54) are split off. The four output beams form a two-dimensional array as required. In an idealized arrangement, where the folding reflectors 60 and 62 can be made 100%, the reflectivities of beam splitters 1 through 3 should be 25%, 33.3% and 50% respectively to generate split beams each of 25% of the input intensity. Table 3 shows the optimal reflectivities for equal intensities in each of the output beams under the assumption that the reflectivity of the reflectors is limited to 90%. The total intensity through the beam splitter here is nearly 87%.

TABLE 3 graded optimized front reflectance, max back reflectance

| Beam | 1 | 2 | 3 | 4 | Folding |
|---|---|---|---|---|---|
| Reflectance | 21.75% | 27.7% | 47.5% | 90% | 90% |
| % output | 21.8% | 21.7% | 21.8% | 21.7% | |

A further aspect of the current invention relates to the electronics used for demodulation of the signals. FIG. 12 shows schematically a preferred electronic scheme. For the example of the four-channel multi-phase interferometer the two signal pairs (Eqs. 4) $i_1$, $i_3$ and $i_2$, $i_4$, (63 through 66 in FIG. 12) are input to two differential amplifiers 67. The output of the differential amplifiers corresponds to the differential signals $d_{13}$ and $d_{24}$ (68 and 69, respectively). These signals are each amplified with a square law amplifier 70 and summed by a summer 71. The resulting signal 72, is used in its squared form, or linearized by means of a square-root amplifier (not shown in FIG. 12), or processed in digitized form. The square form amplifier 70 is implemented with electronic components, firmware in an electronic processor, or alternatively with an opto-coupler taking advantage of the fact that a photodetector is a square law detector.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical perturbation sensing system, comprising:
   a probing beam incident on a medium with perturbations;
   a sensing beam redirected from said medium and incident on a surface area of a photodetector;
   a reference beam directed onto the photodetector surface to form, with the sensing beam, an interference pattern on the photodetector surface;
   a phase patterner with at least two phase regions across its section, to generate different phases in different regions of said interference pattern;
   an array of photodetector elements, to detect each phase region of the interference pattern; and a constructive combiner for constructively combining detected signals from said elements, to form a stronger detected signal with reduced intensity noise, reduced background noise, and reduced sensitivity to phase drifts;

the constructive combiner being adapted to subtract pairs of said detected signals, square the subtracted signal squares, and sum up said squared signals.

2. The system as claimed in claim 1, wherein said medium is a surface redirecting the probing beam by reflection.

3. The system as claimed in claim 1, wherein said constructive combiner comprises differential amplifiers, square law converters and a summer.

4. The system as claimed in claim 1, wherein the phase patterner generates four phase regions having relative phases of $0, \pi/2, \pi, 3\pi/2$, respectively.

5. The system as claimed in claim 4, wherein said constructive combiner comprises two differential amplifiers to generate the signal differences between the 0 and $\pi$ regions and the signal differences between the $\pi/2$ and $3\pi/2$ regions, generate an electronic signal proportional to the square of the said difference signals, and sum the squared signals in a summer.

6. The system as claimed in claim 1, wherein the phase patterner comprises a reflector with stepped surfaces, each of said stepped surfaces generating a region with a different phase.

7. The system as claimed in claim 1, wherein the phase patterner comprises a transmissive substrate with stepped surfaces, each said surface step generating a region with a different phase.

8. The system as claimed in claim 1, wherein the phase patterner comprises two of polarizing elements to form regions of different polarization in an incident beam, a retarder to change the relative phase of one of the polarizations, generating a region with a different phase.

9. The system as claimed in claim 1, wherein the phase patterner comprises two polarizing elements to form regions of different polarization in an incident beam, a retarder to change the relative phase of one of the polarizations, generating a region with a different phase and an additional phase patterner to form additional phase pattern regions.

10. The optical perturbation sensing system as claimed in claim 1, wherein each of the probing beam, the sensing beam and the reference beam is a respective set of multiplexed beams.

11. The system as claimed in claim 10, wherein said constructive combiner comprises differential amplifiers, square law converters and a summer.

12. The system as claimed in claim 11, including four phase shifters adapted to generate four interference patterns with relative phases of $0, \pi/2, \pi, 3\pi/2$, respectively for controlling the interference phase on four detector elements, and wherein said constructive combiner comprises two differential amplifiers to generate the signal differences between the 0 and $\pi$ regions and the signal differences between the $\pi/2$ and $3\pi/2$ regions, generate an electronic signal proportional to the square of the said difference signals, and sum the said signals in a summer.

13. The system as claimed in claim 11, wherein the multiplexed beam sets comprise several beams of different chromaticity.

14. The system as claimed in claim 11, wherein the multiplexed beam sets comprise several beams of different spatial location.

15. The system as claimed in claim 14, wherein the multiple, spatially separated beams are generated with a transparent slab, positioned at an angle to the incident beam and where one of its surfaces is highly reflecting with a small aperture for the incident beam, and its other surface has a graded reflectivity with decreasing reflectivity at the region of exit of each multiply split beams.

16. The system as claimed in claim 15, wherein four spatially separated beams are generated with a transparent slab, positioned at an angle to the incident beam and where one of its surfaces is highly reflecting with a small aperture for the incident beam, and its other surface has a graded reflectivity with decreasing reflectivities of approximate values 80%, 70%, 53% and 4% respectively, to generate four beams of nearly equal intensities.

17. The system as claimed in claim 14, wherein four spatially separated beams are generated with a series of three beamsplitters with increasing reflectivities of approximate values 22%, 28% and 47% plus a reflector of approximately 90%, to generate four beams of nearly equal intensities.

18. A method for detection of perturbations in a medium, comprising:

generating a probing beam;
incidenting said beam on a medium;
sensing the beam reflecting from said medium and incidenting it on a photodetector;
combining said reflected beam with a reference beam on a photodetector;
segmenting said photodetector into elements;
introducing a phase patterner to pattern the phase of the interference pattern and generate a different interferometric phase on each said photodetector element;
detecting signals from each element;
subtracting pairs of said detected signals;
squaring the subtracted signal squares, and
summing up said squared signals to an overall stronger detection signal, with reduced intensity noise, reduced background noise and reduced sensitivity to spurious phase shifts.

19. The method as claimed in claim 18, comprising a phase patterner with four phase regions, four photodetector elements and signals with relative phase shifts of $0, \pi/2, \pi$ and $3\pi/2$.

20. The method as claimed in claim 18, including multiplexing each of the probing beam, the sensing beam and the reference beam.

* * * * *